Figure 1:
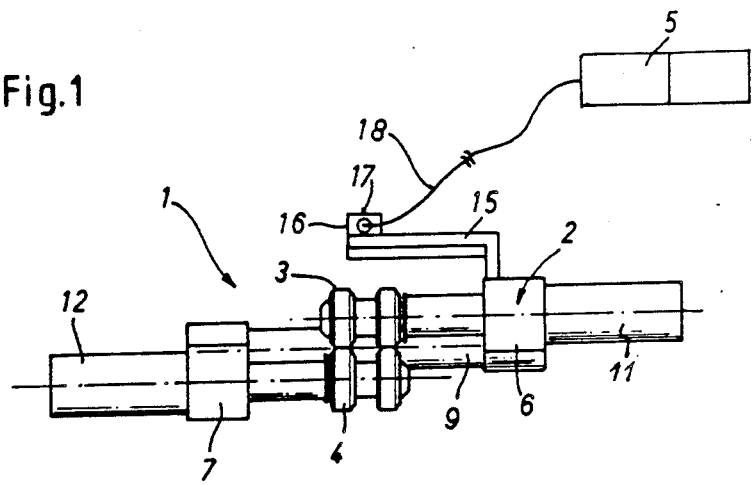

United States Patent [19]

Neumüller et al.

[11] Patent Number: 4,769,102
[45] Date of Patent: Sep. 6, 1988

[54] WELDING APPARATUS

[76] Inventors: Walter Neumüller, Hauptstrasse 71, A-2434 Mannersdorf; Friedrich Liebl, Corethgasse 25, A-2434 Gotzendorf, both of Austria

[21] Appl. No.: 791,800

[22] Filed: Oct. 28, 1985

[30] Foreign Application Priority Data

Nov. 13, 1984 [AT] Austria .................................. 3583/84

[51] Int. Cl.⁴ .......................... B30B 3/04; B30B 15/34
[52] U.S. Cl. ..................................... 156/359; 156/499; 156/553; 156/555; 156/574; 156/582; 156/583.1
[58] Field of Search ...................... 156/583.4, 502, 555, 156/583.1, 585.5, 582, 499, 157, 359, 308.4, 309.9, 581, 574, 290, 203, 466, 583.91, 553

[56] References Cited

U.S. PATENT DOCUMENTS

| | | | |
|---|---|---|---|
| 2,387,566 | 10/1945 | Cüsters | 156/555 |
| 3,109,764 | 11/1963 | Natelli | 156/582 |
| 3,229,620 | 1/1966 | Rogers | 156/583.5 |
| 3,624,836 | 11/1971 | Rohdin | 156/583.4 |
| 3,748,207 | 7/1973 | Campbell | 156/359 |
| 4,146,419 | 3/1979 | Neidhart | 156/574 |
| 4,560,431 | 12/1985 | Inselmann | 100/93 RP |

Primary Examiner—Michael W. Ball
Assistant Examiner—J. Davis
Attorney, Agent, or Firm—Kurt Kelman

[57] ABSTRACT

A welding apparatus for producing at least two spaced welding seams for welding together overlapping ends of two lengths of thermoplastic synthetic resin sheets at a welding station, comprises a frame, a heating device arranged on the frame ahead of the welding station in an operating direction and being displaceable in this direction. The heating device includes at least two spaced welding wedges and a separate heating element arranged in each one of the welding wedges, each heating element being independently thermostatically controllable.

1 Claim, 3 Drawing Sheets

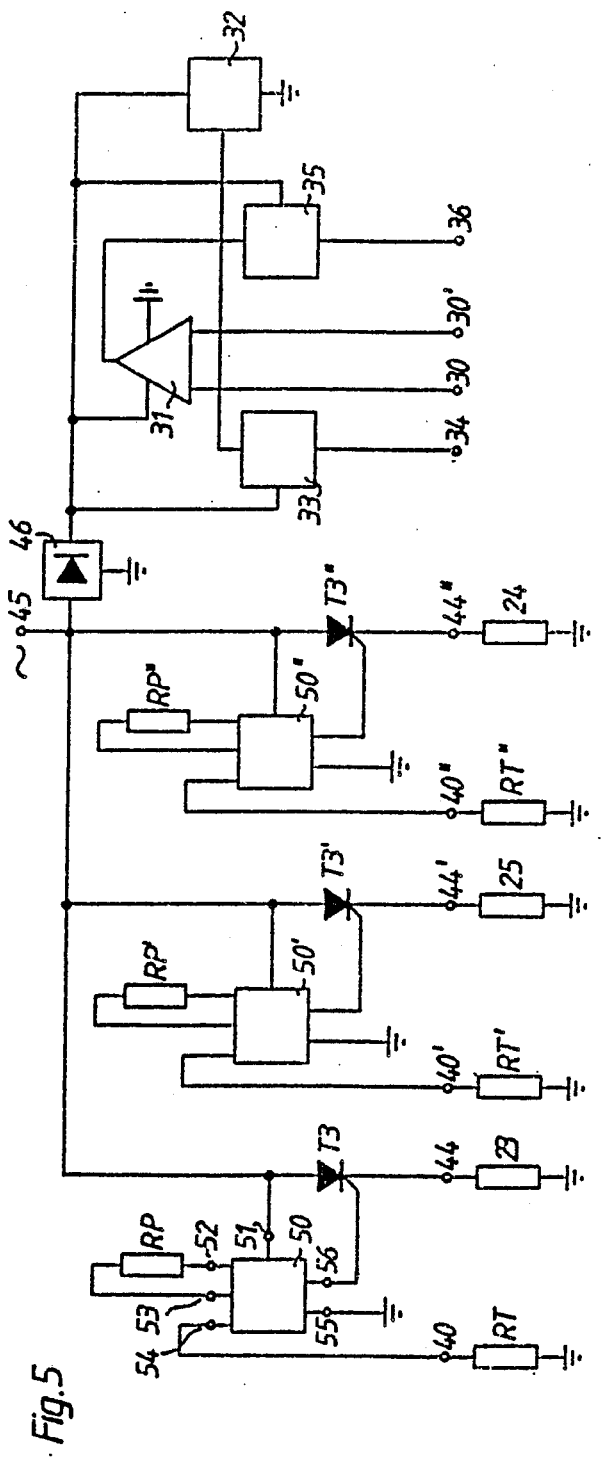
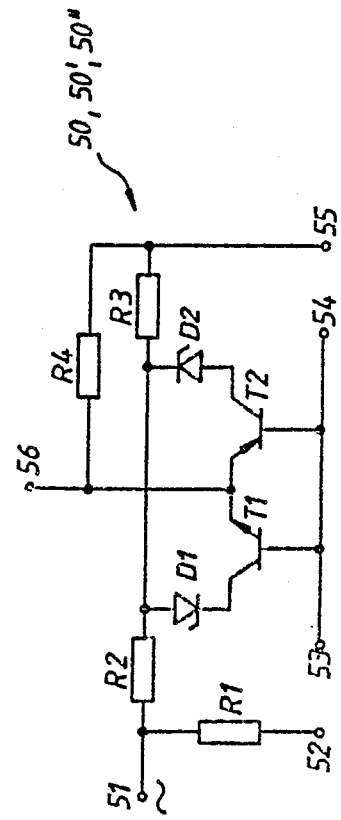
Fig.5
Fig.6

WELDING APPARATUS

The present invention relates to improvements in a welding apparatus for simultaneously producing two spaced welding seams for welding together overlapping ends of two lengths of thermoplastic synthetic resin sheets at a welding station, which comprises a frame, a heating device arranged on the frame ahead of the welding station in an operating direction. The heating device is displaceable in this direction, and includes two spaced welding wedges, and two oppositely disposed, motor-driven pressure rollers pressable against each other.

To test the density of the welding seams, the space between the spaced welding seams is filled with compressed air or the like, and the pressure is measured over a predetermined time interval.

In known welding apparatus of this kind, different and uncontrollable operating temperatures occur at the two spaced welding wedges so that the two spaced, parallel welding seams are of a different quality. Therefore, the two seams do not have the desired same phenomena during the density test.

It is the primary object of this invention to overcome this disadvantage in such a welding apparatus so that the parallel welding seams produced thereby have substantially the same quality.

The above and other objects are accomplished in a welding apparatus of the indicated type according to the invention by providing a separate heating element arranged in each one of the welding wedges, each heating element being independently thermostatically controllable.

With this heating arrangement control, exactly the same welding temperature may be provided for each welding seam region independently of different partial temperature differences in the range of the two overlapping synthetic resin sheet ends. In this manner, welding seams can be produced which are qualitatively alike, particularly with respect to the tear resistance, which is of great importance for the density test which follows the welding operation.

Figure 2:
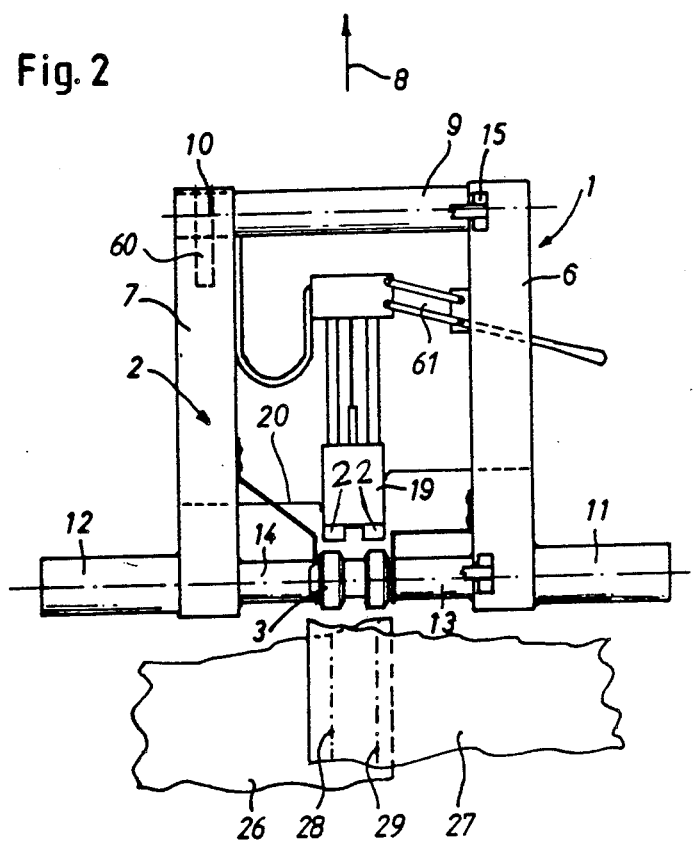
Figure 3:
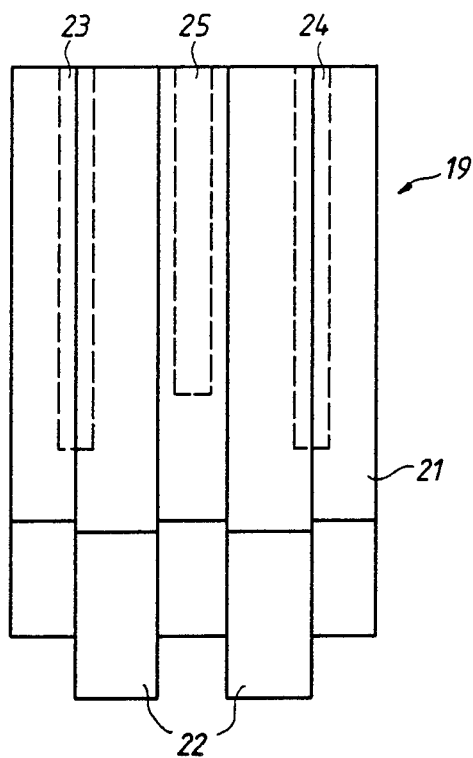
Figure 4:
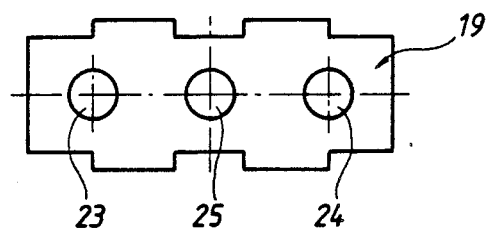

The above and other objects, features and advantages of the present invention will become more apparent from the following detailed description of a now preferred embodiment thereof, taken in conjunction with the accompanying drawing wherein FIG. 1 is a generally schematic front elevation of the welding apparatus, FIG. 2 is a top view of FIG. 1, FIG. 3 is an enlarged top view of the heating device of the invention, FIG. 4 is a schematic cross section of the heating device of FIG. 3, FIG. 5 is a schematic circuit diagram of the heating device control, and FIG. 6 is a schematic circuit diagram of a control circuit element for the heating device.

A welding apparatus of the general type in connection with which the present invention is specifically described and illustrated has been disclosed in our co-pending U.S. patent application Ser. No. 779,078, filed Sept. 23, 1985, whose disclosure is incorporated herein by reference.

Referring now to the drawing, welding apparatus 1 for simultaneously producing two parallel spaced welding seams 28, 29 welding together overlapping ends of two lengths of thermoplastic synthetic resin sheets 26, 27 at a welding station in the path of the sheet ends is shown to comprise a frame 2 movable in an operating direction indicated by arrow 8 in FIG. 2. A heating device 19 for softening the thermoplastic synthetic resin along the sheet ends is arranged on the frame ahead of the welding station and is displaceable in the operating direction. Two oppositely disposed, upper and lower pressure rollers 3, 4 are arranged on the frame trailing the heating device and are pressable against each other. A separate motor 11, 12 is associated with each pressure roller for driving the rollers about respective axes thereof, and an adjustable control 5 is connected to the motors for synchronously driving the rollers.

Motors 11, 12 comprise rotors having respective axes and the roller axes extend coaxial with the rotor axes of the associated motors driving the respective rollers. Planetary gearings 13, 14 are arranged between pressure rollers 3, 4 and associated motors 11, 12. This provides a particularly simple structure and the planetary gearings provide a reduction of the rotary speed and thus produce a favorable torque.

As shown in the preferred embodiment, frame 2 comprises a respective frame portion 6, 7 extending in the operating direction and transversely to the rotor axis of respective motor 11, 12, each frame portion supporting the respective motor at a trailing end thereof, and means is provided for connecting the leading ends of the frame portions opposite to the trailing ends for rotation of one frame portion relative to the other about an axis extending parallel to the rotor axes. The illustrated cOnnecting means is a transverse tube 9 rigidly connected to frame portion 6 while the other frame portion 7 may be pivoted about longitudinal axis 10 of tube 9. In this arrangement, the pressure rollers and their associated motors may be fixed in coaxial relationship in a particularly simple manner to assure precise welding seams independently of the gage of the sheets to be welded together. The frame structure of this arrangement is very simple and, therefore, may be light-weight.

In the illustrated embodiment, each pressure roller 3, 4 comprises two spaced rubber wheels for producing a double welding seam. However, if more than two parallel spaced welding seams are to be produced, a corresponding number of spaced rubber wheels may be provided.

Leaf spring 60 engages in a slot of tube 9 and acts against the inner wall of frame portion 7 to hold frame portion 7 under tension for pressing the pressure rollers together.

Two brackets 15 (only fragmentarily shown in FIG. 2 for the sake of clarity) support handle 16 on frame portion 6 and control switch 17 is mounted on the handle. Control lines 18 lead from control 5 to control switch 17 and from the control switch through tubular bracket 15 to motors 11, 12 and to centrally arranged heating device 19. Parallelogram guide 61 mounts the heating device on frame portion 6 to enable the heating device to be displaced in the operating direction and parallel thereto.

Guide pins 20 are affixed to frame portions 6 and 7 for guiding heating device 19 during its displacement.

As best shown in FIG. 3, the heating device includes aluminum body 21 carrying spaced welding wedges 22 for producing the respective welding seams. Ceramic heating elements 23 and 24 are arranged in the welding wedges and the temperature of these heating elements may be electronically controlled independently of each other. In the preferred embodiment, additional heating element 25 is arranged between the heating elements 23 and 24 which project beyond the additional heating element. Heating element 25 also has a ceramic body and is a stabilized, controlled heating element designed to pre-heat the heating device and to facilitate holding the welding temperature of the aluminum welding wedges constant, usually at about 280° C. to 290° C. Because of the projections in the range of the two heating elements, they cannot influence each other. If the welding wedge angle is relatively small, a longer contact zone with the overlapping sheet ends gliding thereover will be provided, which enhances the heat transfer thereto. The total capacity of heating device 19 is three times 80 W. This capacity is delivered through control lines 18 galvanically separate.

To assure the synchronous running of motors 11, 12, each motor is equipped with a suitable sensor (not shown) for measuring the rotational speed thereof and these sensors are connected to terminals 30, 30′ of control 5 (shown in FIG. 5) to transmit control signals corresponding to the sensed rotational speed thereto, electric power being delivered to motors 11, 12 through control circuit elements 33, 35, which may be transistors.

As shown in FIG. 5, the outputs of control circuit elements 33, 35 are connected to terminals 34, 36 respectively connecting motors 11, 12 to adjustable control 5. The control circuit elements deliver a current to the motors respectively connected thereto, which current corresponds to the control signals.

The input of control circuit element 33 is connected to setting circuit 32, which may be a potentiometer and provides a current of the desired value, which is delivered to the motor selected as guide motor while control circuit element 35 for the other motor is connected to the output of regulator 31, which changes the existing current value to the desired current value, the control signal of the rotational speed sensor of the guide motor being delivered to one of the inputs of regulator 31 as the desired current value while the control signal of the rotational speed sensor of the other motor is delivered to the other input of the regulator as the existing current value. The resultant output signal of regulator 31 delivers a control signal to the other motor whose value assures the synchronous rotation of the two motors by delivering the desired current value to the other motor through control circuit element 35.

An alternating current source is connected to terminal 45 of control 5 and this current is converted to direct current by rectifier circuit element 46 to supply direct current to the inputs of regulator 31, setting circuit 32 and control circuit elements 33, 35.

Temperature sensors RT, RT′ and RT″, such as thermistors, in the region of spaced welding wedges 22 and the central portion of heating device 19 are connected to terminals 40, 40′ and 40″, respectively, which, in turn, are connected to terminals 54 of a respective control circuit element 50, 50′ and 50″ for respective thyristor T3, T3′ and T3″. The thyristors control the current flow to heating elements 23, 24 and 25 which are connected to control 5 by terminals 44, 44′ and 44″.

Setting circuit elements RP, RP′ and RP″, such as adjustable resistances, are connected to terminals 51 and 52 of control circuit elements 50, 50′ and 50″. Terminals 55 of these control circuit elements are grounded, their output terminals 56 are connected to the control electrode of thyristors T3, T3′ and T3″, and their input terminal 51 receives alternating current from the current source.

As can be seen from FIG. 5, heating elements 23, 24 and 25 are controlled independently of each other. In the illustrated embodiment, control 5 comprises three setting circuit elements but these circuit elements are preferably mechanically coupled in a manner not shown to make it possible to set the desired value for each heating element. However, it would also be possible to provide only a single setting circuit element for all three control circuit elements 50, 50′ and 50″, in which case terminals 52 and 53 of one of the control circuit elements would be connected in parallel.

Control circuit elements 50, 50′ and 50″ for all three thyristors are the same and are illustrated in FIG. 6. These control circuit elements enable the heating capacity of each heating element 23, 24 and 25 to be steplessly adjusted in response to the desired value of the temperature respectively set by corresponding setting circuit element RP, RP′ and RP″. Each thyristor is controlled by a stabilized voltage divider and two Zener-diodes D1, D2 which are coupled to transistors T1, T2 by a duplex connection. The stabilized voltage divider, which is constituted by thermistor RT, RT′ and RT″ and the setting circuit element, controls the base of the transistor. The Zener-diodes serve to compensate for net voltage variations of ±10%. The control voltage for the thyristor rises or falls in response to the adjustment of the setting circuit element and the magnitude of the thermistor resistance, which is determined by the temperature at the respective measuring point, i.e. spaced welding wedges 22 and the center region. Thus, the capacity of the heating is controlled by a phase cut which depends on the temperature at the measuring point. Resistances R1, R2, R3 and R4 serve to determine the operating points of transistors T1, T2.

What is claimed is:

1. A welding apparatus for simultaneously producing two spaced welding seams for welding together overlapping ends of two adjoining lengths of thermoplastic synthetic resin sheets at a welding station, which comprises
   (a) a frame movable along the overlapping sheet ends in an operating direction,
   (b) a heating device arranged on the frame ahead of the welding station in the operating direction, the heating device being displacable in said direction and including
      (1) two spaced welding wedges arranged side-by-side in said direction,
      (2) a seperate heating element having a ceramic body arranged in each one of the welding wedges, each heating element being independently thermostatically controllable, and
      (3) an aditional heating element arranged between the separate heating elements, the separate heating elements projecting beyond the additional heating element, and
   (c) two oppositely disposed, motor-driven pressure rollers pressable against each other, the pressure rollers including
      (1) two spaced annular ridges in alignment with the welding wedges in said direction.

* * * * *